(Model.) 2 Sheets—Sheet 1.
E. HORTON.
MACHINE FOR TURNING ARBORS FOR PINIONS.
No. 247,352. Patented Sept. 20, 1881.
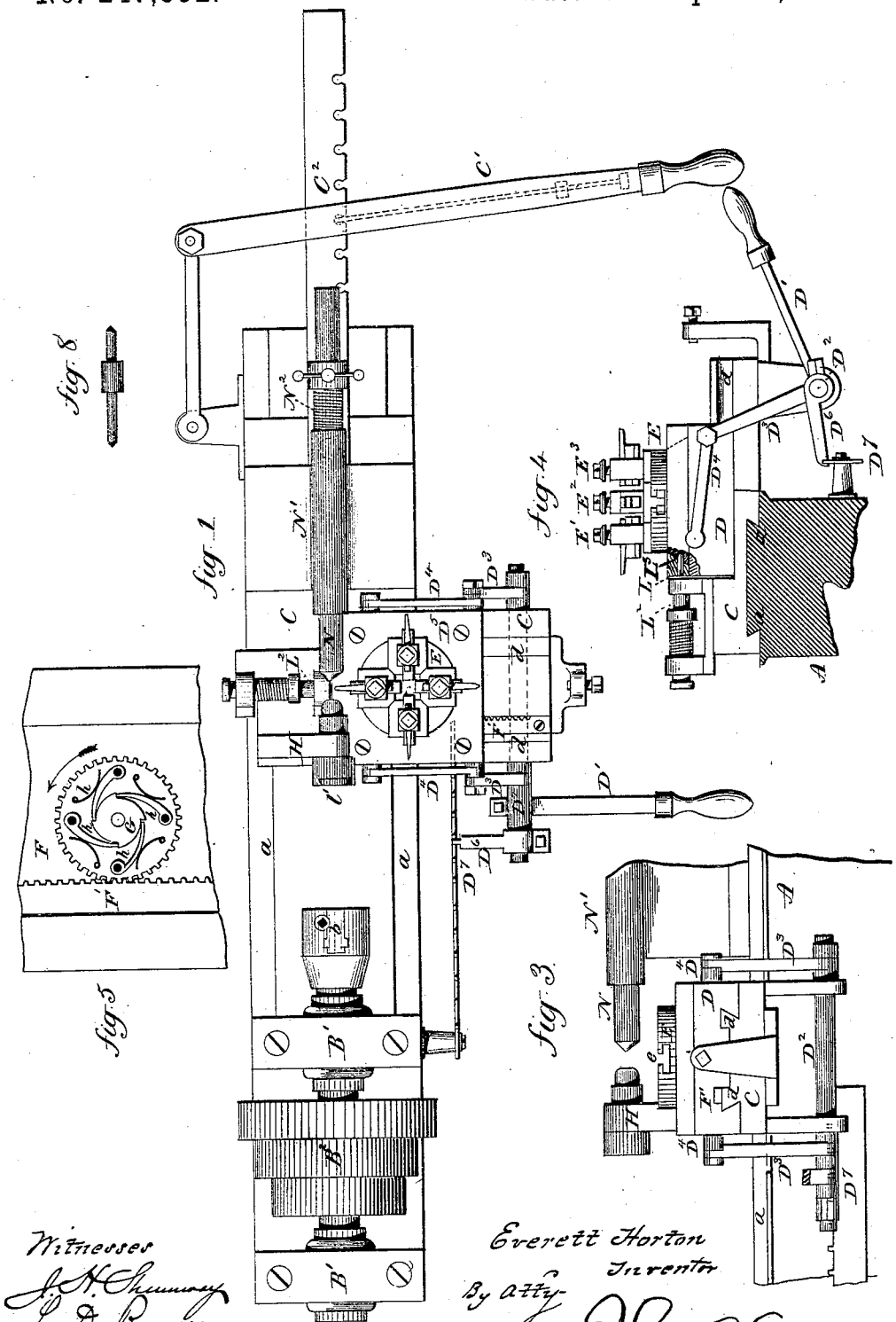

(Model.)  2 Sheets—Sheet 2.
E. HORTON.
MACHINE FOR TURNING ARBORS FOR PINIONS.
No. 247,352. Patented Sept. 20, 1881.
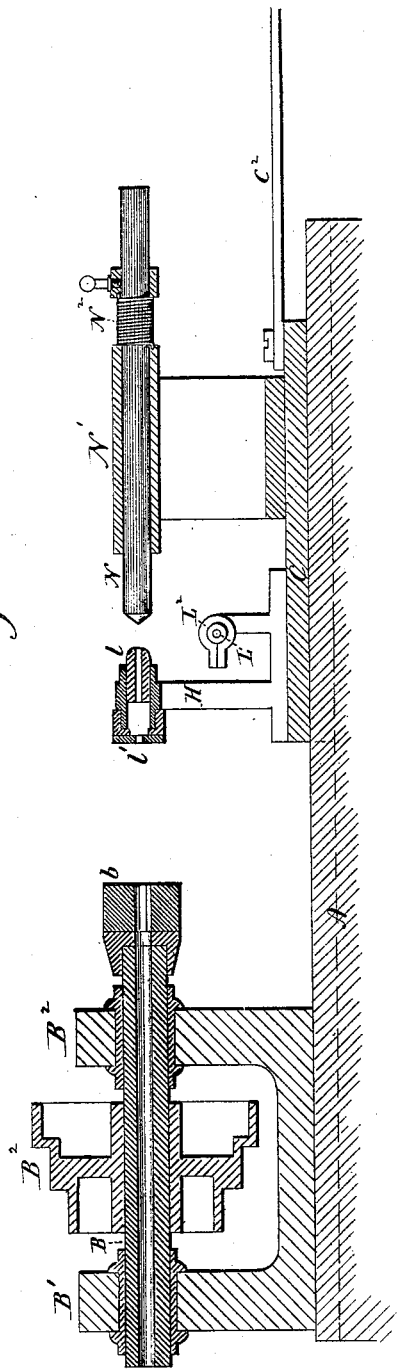
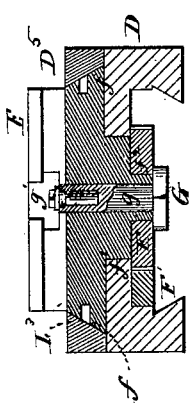
Witnesses:
J. H. Shumway
L. D. Rogers
Everett Horton, Inventor
By atty John S. Earle

UNITED STATES PATENT OFFICE.

EVERETT HORTON, OF NEW HAVEN, CONNECTICUT.

MACHINE FOR TURNING ARBORS FOR PINIONS.

SPECIFICATION forming part of Letters Patent No. 247,352, dated September 20, 1881.

Application filed May 2, 1881. (Model.)

*To all whom it may concern:*

Be it known that I, EVERETT HORTON, of New Haven, in the county of New Haven and State of Connecticut, have invented a new Improvement in Machines for Turning or Reducing Metal Rods; and I do hereby declare the following, when taken in connection with the accompanying drawings, and the letters of reference marked thereon, to be a full, clear, and exact description of the same, and which said drawings constitute part of this specification, and represent, in—

Figure 1, a top or plan view; Fig. 2, a longitudinal section; Fig. 3, a partial front view; Fig. 4, a transverse section through the bed, showing side views of the slide, carriage, and turret; Figs. 5, 6, and 7, detached views. Fig. 8 shows a side view of the work which may be done on the machine.

This invention relates to a machine for shaping articles from metal rods, as for small bolts, small pinions, such as are made a part of the shaft, and many other articles which may be made from wire rods, and which are of different diameters at different points, with special reference to watch and clock work and parts of light machinery, the object of the invention being to construct a machine which will receive a rod a little larger than the largest diameter required to be produced, and by the process of turning reduce the rod to the required diameter at a single cut; and in such a machine this invention consists.

A is the bed, constructed similar to a lathe-bed, with guideways $a$ on its upper surface. At one end a hollow mandrel, B, is arranged in bearings B′, similar to the mandrel of a lathe, and which is caused to revolve by the application of power thereto through pulleys B². The internal diameter of the hollow or tubular mandrel B is sufficient to receive a rod of the largest diameter required. In the head of the mandrel is a pair of griping-jaws, $b\,b$, or other suitable device, to gripe the rod introduced and hold it concentric, and so as to revolve with the mandrel.

C is a slide, arranged to be moved longitudinally on the guideways $a$ of the bed A by means of a hand-lever, C′, engaging one of the notches of the arm C², attached to the outer end of the slide C, so that the operator, taking hold of the handle of the lever C′, may move the slide C longitudinally on the bed, and after one movement the lever may be moved rearward to engage a second notch, and so on; or the lever may be permanently attached to the arm C².

On the slide C is a carriage, D, arranged in transverse guides $d$ so as to be moved in and out or toward and from the central longitudinal line of the machine, and it is so moved by means of a hand-lever, D′, attached to a rock-shaft, D². From the rock-shaft arms D³ extend upward, and are connected by pitmen D⁴ to the carriage D, so that as the workman raises the lever D′ he moves the carriage inward, or as he depresses the lever he moves the carriage outward.

On the carriage D is the revolving tool-carrying turret E, having radial inverted-T-shaped slots $e$ in its upper surface, each to receive one of several tool-stocks, E′ E² E³, &c., and so that as the carriage moves inward it presents one of the tools for operation upon the rod.

As the work to be done is of the most delicate character, the parts must be constructed so as to prevent the least possible play. To this end the turret or rotating tool-carrier E is constructed in circular form, its lower edge projecting so as to present an inclined annular surface, $f$, as seen in Fig. 6, and is set flat upon the upper surface of the carriage D. Then over this inclined projecting edge $f$ a plate, D⁵, is set and screwed upon the carriage, which secures the turret to the carriage by a firm bearing at its outer edge, presenting a large surface at the bottom, so that no play of the turret in its bearing is possible.

From the under side of the turret a circular projection, $f'$, extends through a corresponding opening in the top of the carriage, and on the under side of this extension a concentric bearing, $f^2$, is made to receive a toothed pinion, F, loose on the said bearing, so as to revolve thereon independently of the turret. This pinion engages with a correspondingly-toothed rack, F′, stationary on the slide C, (see Fig. 1,) so that as the carriage is moved in and out and the pinion working in the rack (see Figs. 1 and 5) will impart a corresponding rotary movement to the pinion F.

Firmly attached to the turret below the pinion is a ratchet, G. (See Fig. 5.)

Hung to the pinion is one or more spring-pawls, $h$, the nose engaging the ratchet, so that when the carriage D is moved outward the pinion F will be turned in the direction of the arrow, Fig. 5, and, thus revolving, will, because of the engagement of the pawl with the ratchet G, impart a corresponding rotation to the turret. Then, when the carriage is moved inward, the pinion F will revolve in the opposite direction, the pawls passing freely over the teeth of the ratchet, leaving it, with the turret, stationary. Each rotative movement of the turret presents a new tool to the front.

To permit the adjustment of the ratchet G relatively to the turret and so as to make a firm connection between the two, the ratchet G is constructed with a spindle, $g$, extending centrally up through the turret, its upper end split, as seen in Fig. 7, and internally threaded to receive a conical screw, $g'$, so that turning in the screw expands the upper or split end of the spindle $g$, causing it to bind in its seat in the turret, and thus firmly secure it in place. By loosening the screw $g'$ the end of the spindle contracts and permits the ratchet to be turned to change its relative position to the turret, and then be reset.

Attached to the slide C, and moving with it, is the rest H. In the head of this rest and in the longitudinal central line of the mandrel a socket, $l$, is arranged, having a longitudinal opening through it corresponding to the diameter of the rod to be worked, so that the rod will rest firmly therein. The position of the end of this socket relative to the tools on the turret is such that the tool stands close to the end of the socket, as seen in Fig. 1.

As the rods found in the market vary somewhat in diameter, and sometimes are not perfectly cylindrical, it is necessary to bring them to such perfect and uniform cylindrical shape and size in order that they may take a close bearing within the socket $l$. For this purpose a cutting-die, $l'$, is arranged in the end of the rest opposite the socket through which the rod must pass before it reaches the socket $l$. The diameter of the die $l'$ and the opening through the socket corresponding, it follows that the rod will be reduced to the precise diameter of the socket, so as to fit closely therein.

The operation of reducing the rod is performed as follows: The rod is introduced through the mandrel until its end reaches the die $l'$ on the rest, and is then secured firmly in the head of the mandrel. The mandrel, revolving, imparts a corresponding revolution to the rod. The workman, by means of the lever C', moves the slide toward the head-stock or mandrel, and with it the rest H, carrying the die $l'$ onto the rod, reducing the rod to the shape of the die until its end protrudes through the socket $l$. At this point the carriage D is moved forward to bring the requisite cutter to the end of the rod. The forward movement of the carriage D to present the tool is arrested by an arm, $D^6$, on the rock-shaft $D^2$ striking a guide, $D^7$. (See Figs. 1, 2, and 3.) The guide $D^7$ is secured to the frame and shaped corresponding to the cut to be made. The arm $D^6$ rides on the guide $D^7$ as the slide is moved toward the head-stock. The cutter, working from the end of the rod, cuts away the metal to form a blank corresponding to the shape indicated by the guide. Suppose a clock-pinion is to be turned—such, for instance, as seen in Fig. 8—the pinion itself being the full diameter of the rod as reduced by the die $l'$, the reduction of the rod by the tools on the turret is intended simply to form the shaft for the pinion and the bearings at the end, which, in this case, are conical. The operation of the first tool will make the conical bearing. The tool is forced up to place by the lever D'—that is, until the arm $D^6$ strikes the guide $D^7$. Then, as the slide is moved by the lever C', the cutter in the first tool-holder will shape the conical end. The carriage D is then drawn back by depressing the lever D', in which operation the second tool is presented. The lever D' is then raised until the arm $D^6$ rests upon the guide $D^7$. A longitudinal movement is then given to the slide by the lever C' advancing the tool onto the rod, reducing it until it reaches the first end of the pinion-blank, or forming the first shoulder. The length of that cut may be determined by the space on the guide $D^7$. That point reached, the carriage is again drawn outward, as before, presenting a tool which will cut down the shoulder upon the opposite side of the pinion, and when the full depth of the cut is made the slide is again moved to complete that end of the shaft. This done, the carriage is again drawn outward and returned, presenting the fourth tool to cut the conical bearing at that end and separate the shaft and its pinion-blank from the rod. The operation is then repeated until the die $l'$ comes close up to the head of the mandrel, when the slide is returned and the rod moved along in the mandrel to present a new length to be cut.

On very light work it is desirable to support the free end of the work. For this purpose a spring-spindle, N, is arranged in a sleeve, N', on the slide in longitudinal line with the axis of the mandrel and of the socket $l$. A spring, $N^2$, is applied to the rear end of the spindle, one end attached to the sleeve and the other to the spindle, the spring acting to force the spindle toward and close up to the end of the socket, so that the end of the rod will, on its first issuing from the socket, come into contact with the end of the spindle, that end of the spindle being shaped to receive and support the end of the work so presented. The spring yields as the slide advances, so as to serve as a constant support for the free end of the work. When the article has been completed and cut from the rod it falls from the machine, the spindle automatically advances by the action of the spring $N^2$ and comes into place to receive the next end presented, and so continues.

To insure the positive proper presentation of the tools on the turret, a guide-pin, L, is arranged on the slide at the rear in the end of a spindle, $L^2$, with a corresponding hole in the rear side of the carriage, through which the spindle L² will enter as the carriage comes up to place, the spindle extending through the side of the carriage (or plate D⁵) and into a corresponding hole, L³, in the turret, as seen in Fig. 4.

In the turret there are holes L³, each corresponding to a tool on the turret, so that when in proper position the spindle L² will enter the corresponding hole in the turret, and, fitting it closely, lock the turret firmly in its working position and prevent the possibility of lateral movement of the tool.

Blanks of various diameters may be turned. For instance, supposing the pinion, Fig. 8, to be of smaller diameter than the rod from which it is made, so that its surface must be reduced, one of the tools will be employed to reduce that part; and if the various parts of differing diameters are cylindrical, the surface of the guide D⁷ will be straight, the different tools for the varying diameters of rod being set so that when the carriage is fully advanced they will stand the requisite distance from the axial line to produce the desired cut; but whatsoever the reduction to be made, it is done at a single cut, the cutter making that reduction working upon the rod close to the end or mouth of the socket l.

Shoulders or stops should be arranged on the guide D⁷ to arrest the movement of the slide when the requisite length for a given tool has been cut. If tapers or irregular surfaces are to be cut, then it will be understood the corresponding part of the guide is to be made to raise or lower the end of the arm D⁶ working thereon, so as to move the carriage D out or in, as the case may be.

Instead of employing a hand-lever, C', an automatic feed may be given to the slide C, as in feeding the slide of an engine-lathe; but I prefer the hand-lever, because when making a great reduction the cut must be slower than would be required with a less reduction; hence with the hand-lever the judgment of the workman will enable him to adapt the feeding of the slide to the work being done.

The illustration of the invention as applied to making the pinion, Fig. 8, will be sufficient to enable others skilled in the use of this class of machinery to adapt the machine to making other small articles from wire rods.

I am aware that a hollow mandrel for holding and revolving a rod to be turned is well known, and also that a tool-holder arranged to successively present several tools to perform certain work upon the rod is well known, and therefore do not broadly claim such devices.

I claim—

1. The combination of a revolving mandrel fitted to hold and revolve the rod to be turned, a slide arranged for longitudinal movement relatively to said mandrel, a rest on said slide, carrying a socket through which the rod to be turned passes, a tool-carrying turret arranged on a carriage to be moved transversely on said slide, and mechanism, substantially such as described, to impart a rotating movement to said turret to successively present the several tools on the turret, substantially as described.

2. The combination of a mandrel arranged to hold and revolve the rod to be turned, a slide arranged for longitudinal movement relatively to said mandrel, a rest stationary on said slide, carrying a socket through which the rod passes, and a die on said rest in the same longitudinal line as the socket, arranged to reduce the rod to the diameter of the socket, substantially as described.

3. The combination of a revolving mandrel arranged to hold and revolve the rod to be turned, a slide arranged for longitudinal movement relatively to said mandrel, a rest on said slide, carrying a socket through which the rod to be turned passes, and a tool-carrying turret arranged on a carriage to be moved transversely on said slide to the longitudinal or axial line of the mandrel and socket, substantially as described.

4. The combination of a revolving mandrel arranged to hold and revolve the rod to be turned, a slide arranged for longitudinal movement relatively to said mandrel, a tool-carrying carriage arranged in transverse guides on said slide, a rock-shaft hung in said slide, with a hand-lever extending therefrom, and connections from said shaft to said carriage, whereby a transverse movement is imparted to said carriage, an arm on said rock-shaft, and a stationary guide upon the bed, upon which the said arm works to govern the movement of said carriage, substantially as described.

5. The combination of a revolving mandrel arranged to hold and revolve the rod to be turned, a slide arranged for longitudinal movement relatively to said mandrel, a carriage arranged on said slide to be moved transversely thereon, a revolving tool-carrying turret on said carriage, and the spindle L on said slide, arranged to enter through an opening in the carriage to a seat in the turret, substantially as and for the purpose described.

6. The combination of the turret E, constructed with the annular inclined projection f, and so as to rest upon the upper surface of the carriage D, with the plate D⁵, arranged to rest upon said annular incline f and secured to the carriage, substantially as described.

7. The combination of the turret E and the ratchet G, constructed with the split spindle to enter and extend through the turret, with the conically-shaped screw G' in the said split end of the spindle, substantially as and for the purpose described.

EVERETT HORTON.

Witnesses:
L. D. ROGERS,
J. H. SHUMWAY.